SELF-ADAPTIVE INFORMATION STORAGE DEVICES

Filed Aug. 18, 1965 7 Sheets-Sheet 1

Inventors
JOHN H. ANDREAE, PETER L. JOYCE
and BRIAN R. GAINES
By Charles L. Johnson Jr.
Attorney

| DECREMENT PULSE | GATES OPEN | | | STATES OF BISTABLES AFTER SWITCHING | | | | | RELATIVE VALUES OF ANALOGUE OUTPUT | DECREMENT PER STEP |
|---|---|---|---|---|---|---|---|---|---|---|
| | | | | $BS_1$ (16) | $BS_2$ (8) | $BS_3$ (4) | $BS_4$ (2) | $BS_5$ (1) | | |
| - | - | - | - | 1 | 1 | 1 | 1 | 1 | 31 | - |
| 1 | $A_2$ | - | - | 1 | 0 | 1 | 1 | 1 | 23 | 0.77 |
| 2 | $A_1$ | $A_2$ | - | 0 | 1 | 1 | 1 | 1 | 15 | 0.65 |
| 3 | $A_3$ | $B_2$ | - | 0 | 1 | 0 | 1 | 1 | 11 | 0.73 |
| 4 | $A_3$ | $B_1$ | $B_2$ | 0 | 0 | 1 | 1 | 1 | 7 | 0.63 |
| 5 | $A_3$ | $B_3$ | $C_2$ | 0 | 0 | 1 | 0 | 1 | 5 | 0.71 |

Fig. 2

Inventors
JOHN H. ANDREAE, PETER L. JOYCE
and BRIAN R. GAINES
By Charles T. Johnson Jr.
Attorney Inventors
JOHN H. ANDREAE, PETER L. JOYCE
and BRIAN R. GAINES
By Charles L. Johnson, Jr.
Attorney Inventors
JOHN H. ANDREAE, PETER L. JOYCE,
and BRIAN R. GAINES
By Charles L. Johnson Jr.
Attorney Nov. 12, 1968 J. H. ANDREAE ET AL 3,411,138

SELF-ADAPTIVE INFORMATION STORAGE DEVICES

Filed Aug. 18, 1965 7 Sheets-Sheet 5

Inventors
JOHN H. ANDREAE, PETER L. JOYCE
and BRIAN R. GAINES
By Charles L. Johnson, Jr.
Attorney Inventors
JOHN H. ANDREAE, PETER L. JOYCE
and BRIAN R. GAINES
By Chabs L Johnson
Attorney Inventors
JOHN H. ANDREAE, PETER L. JOYCE
and BRIAN R. GAINES
By Charles L. Johnson Jr.
Attorney United States Patent Office 3,411,138
Patented Nov. 12, 1968

3,411,138

SELF-ADAPTIVE INFORMATION STORAGE DEVICES

John Hugh Andreae, Peter Lawrence Joyce, and Brian Ronald Gaines, London, England, assignors to International Standard Electric Corporation, New York, N.Y., a corporation of Delaware Filed Aug. 18, 1965, Ser. No. 480,717
Claims priority, application Great Britain, Aug. 21, 1964, 34,260/64
8 Claims. (Cl. 340—172.5)

ABSTRACT OF THE DISCLOSURE

A digital store is provided in which the response to an input depends upon the condition of the store on receiving the input; e.g., each input pulse causes the store to shift to a predetermined fraction of an existing value.

Figure 1:
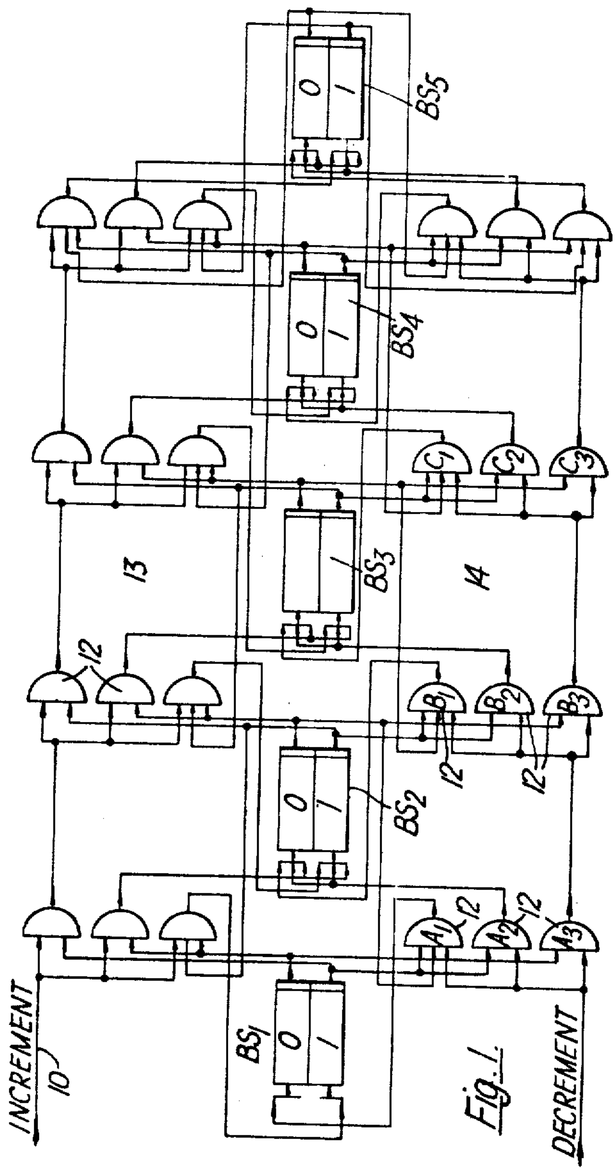

This invention relates to adaptive information storage devices, that is to say, to finite-state memory devices whose stored values progressively approximate to or estimate statistical measures of their inputs.

In many forms of apparatus for carrying out computation-like operations on input data (for example in a so-called "learning machine," in a process controller, in a machine for pattern recognition or in a machine for problem solving), it is necessary to store quantities in analogue form or in a digital form which provides an equivalent precision. Storage in digital form will be preferred in many cases becauses it can be effected at high speed with great precision and indefinitely-maintained accuracy. The values of these stored quantities will be subject to progressive revision as the input to the apparatus varies and the magnitude of individual changes to the stored quantities may depend in part on the currently stored value and in part on the current input. In general the magnitude of individual changes may be small compared to changes which are significant with respect to the required precision of the stored value.

According to the invention, an adaptive information storage device includes a plurality of multistable elements defining by the various combinations of their possible states a scale of storage levels, the states of the multistable elements being arranged to change in response to discrete input signals at an input of the device in such a way that the magnitude of the change in the stored level made by the device in response to an individual input signal has a value (not excluding zero) determined directly or statistically by the values of two or more parameters including at least the value of the input signal and the level stored in the device immediately prior to receiving the said signal.

According to a feature of the invention, the scale of storage levels and the possible values of the input signals define ranges of values that have at least part of each range in common, and wherein any change in the stored level made by the device in response to an individual input signal is made in the direction that results in the lower value of the difference between the values of the input signal and of the new stored level.

The input signals may have a continuous range of possible values or may be quantised, that is to say may be restricted to two or more discrete possible values.

In the preferred form of the invention, positive or negative increment signals derived from the input signals are caused to effect the said changes in storage level. If the input signals have only two possible values that define the range of input values, only the extreme values of the range being possible, and if the range of values defined by the scale of storage levels of the device is not greater than this range of input values, the positive and negative increment signals are derived directly from the two possible input signals. If the range defined by the scale of storage levels is greater than the range of the two possible input values, as may be required in certain applications of the device, then a preliminary comparison between each input signal and the current storage level is necessary to determine the sign of the resulting increment signal. (Such a comparison is in fact necessary whenever two possible values of the input signal define a range that falls wholly within the range defined by the scale of storage levels: the two-valued input referred to about constitutes one limiting case, the other being constituted by a continuous range of values such as that obtained by sampling an analogue input signal.)

According to a further feature of the invention, the storage device is arranged so that the magnitude of the stored level, or of its complement, is caused by a negative or positive increment signal, respectively, to adopt a new value that is or approximates to a predetermined fraction of its previous value. In one preferred arrangement, the multistable elements of the device are bistable storage elements each capable of being set to either of two possible states by a signal at one of two corresponding inputs and of providing a signal at either of two outputs representing its two states, the inputs of each element being associated with the outputs of the elements and with positive and negative increment signal inputs of the device through gating elements so arranged that the magnitude of the stored level, or of its complement, is caused by a negative or positive increment signal, respectively, to adopt a new value that is or approximates to a predetermined fraction of its previous value.

In a second preferred form of the invention, the multistable elements are associated to form a reversible adder, the counting scale formed by the various successive combinations of the states of the elements defining the said scale of storage levels. The device may include means for presenting as an adder output either the count stored in the adder or its complement in the adder counting scale and means for deriving and storing a predetermined fraction of the adder output while causing the adder to step in a negative or positive sense in response to a negative or positive increment signal until equality obtains between the actual value of the adder output and the stored value. In an electrical storage device the adder output may be presented as the magnitude of an output voltage and the said predetermined fraction of the adder output is obtained by a potentiometer circuit, and stored as the charge in a capacitor. Analogous devices can be employed in a storage device based on mechanical, pneumatic, fluid-flow or similar systems.

According to another preferred form of the invention, the device includes means for generating a randomly-varying signal having a range of possible values, and a comparator for determining whether at any instant the value represented by the stored level or the value of the randomly-varying signal is the larger, the output of the comparator being applied to control the response to increment signals of a reversible adder formed by the multistable elements of the storage device, the said adder counting over a scale formed by the various successive combinations of the states of the multistable elements and defining the said scale of storage levels, the arrangement being such that a positive increment signal results in a unit increase of the count stored in the adder, corresponding to a unit increase in the stored level, if and only if the instantaneous value of the randomly-varying signal is greater than the value represented by the stored level, and conversely for negative increment signals, and such that overcounting by the adder beyond its maximum and minimum count condition is prevented.

The term "randomly-varying signal" is used to include signals that vary in a manner which although not truly random in the strict sense has a significant random element. Thus in one arrangement the means for generating a randomly-varying signal includes a source of a periodically-varying analogue signal which is sampled at instants determined by the increment signals. The sampling rate and the period of the analogue signal being asychronous so that the sampled analogue signal has a pseudo-random character. In an alternative arrangement the means for generating a randomly-varying signal includes a plurality of further multistable elements which define by the various combinations of their possible states the said range of possible values, and which are so associated that a succession of stepping signals presented thereto causes the value represented by the states of the further multistable devices to vary in a pseudo-random manner.

Figure 3:
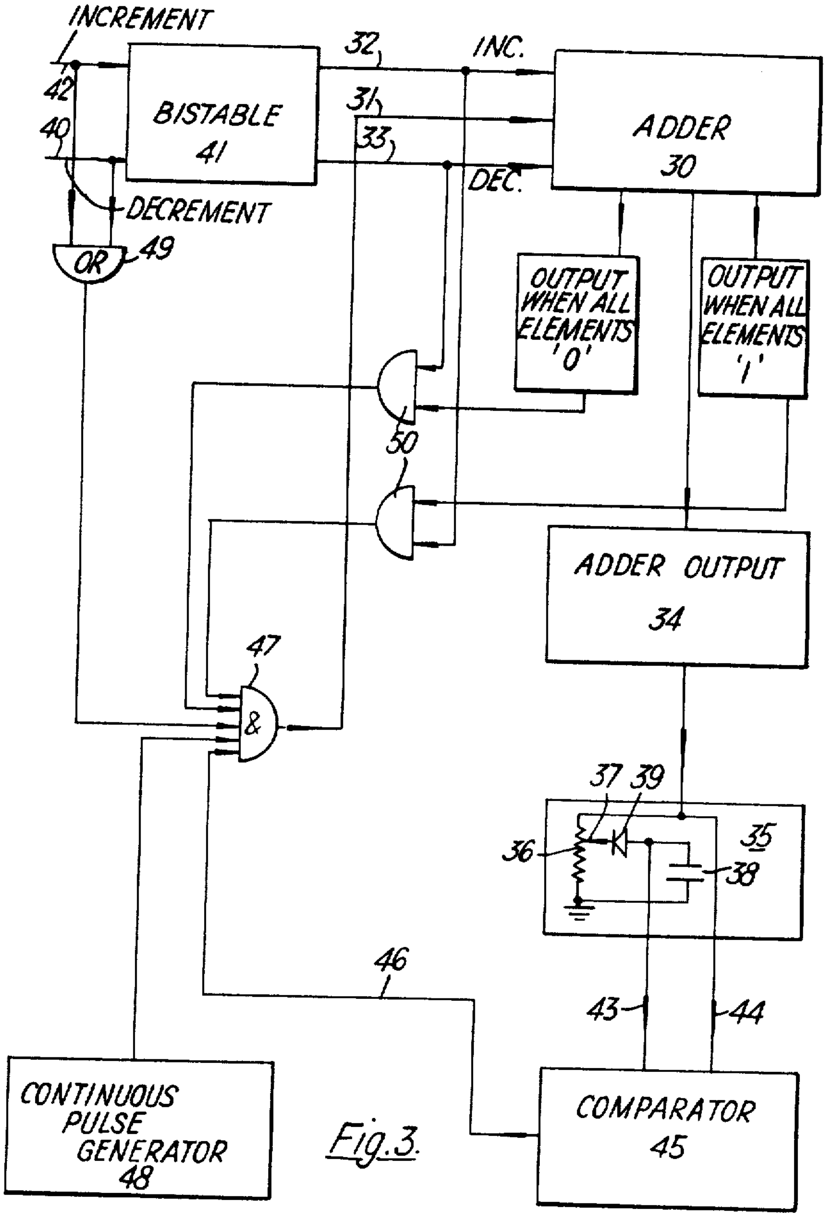
Figure 4:
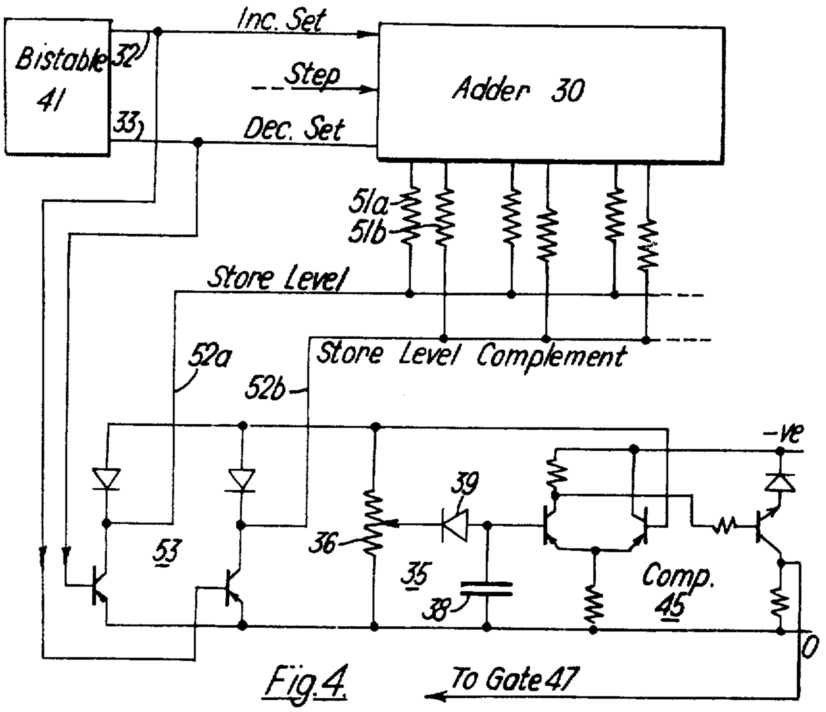
Figure 5:
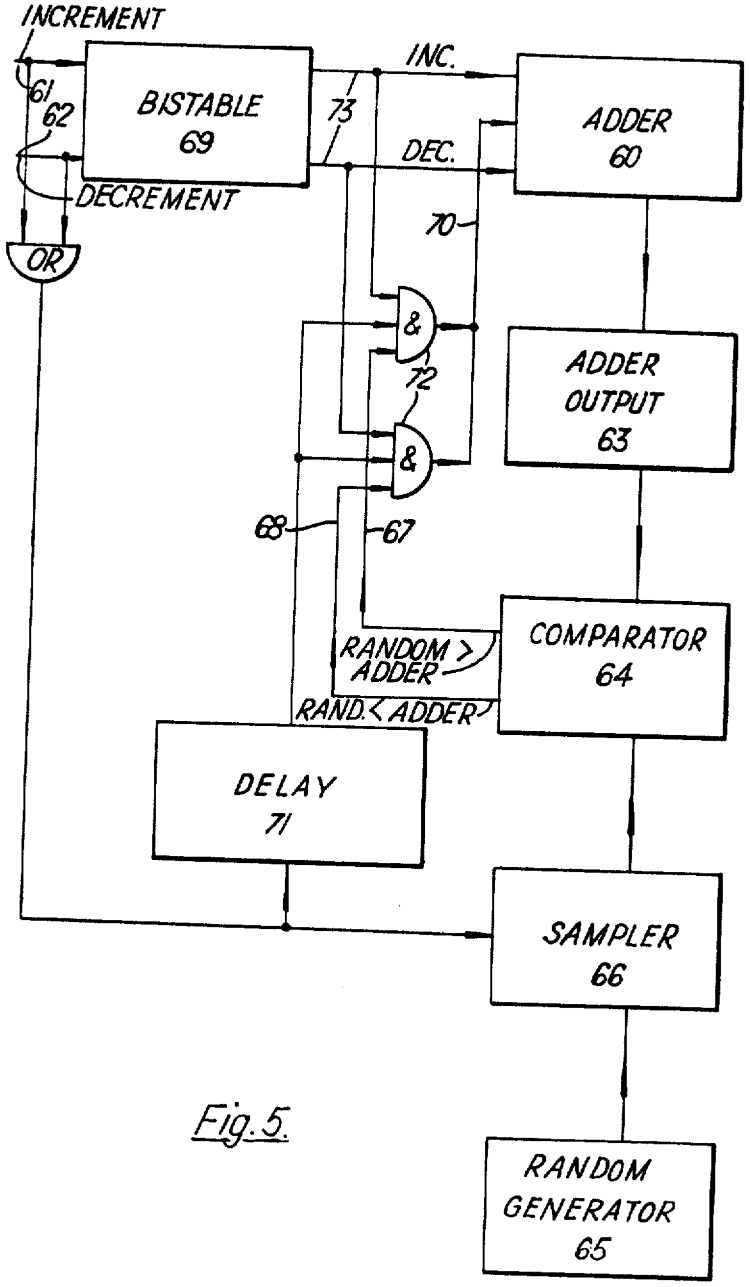
Figure 6:
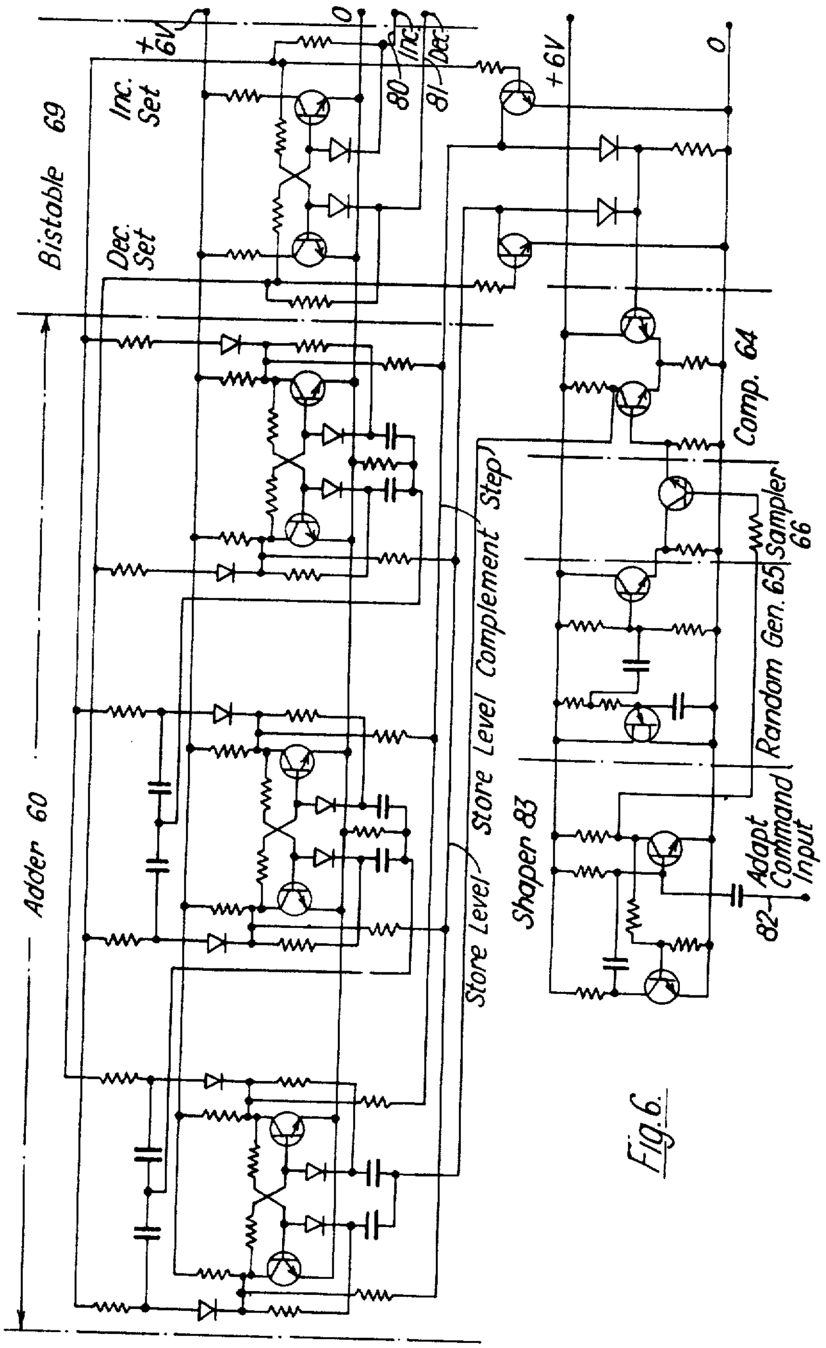
Figure 7:
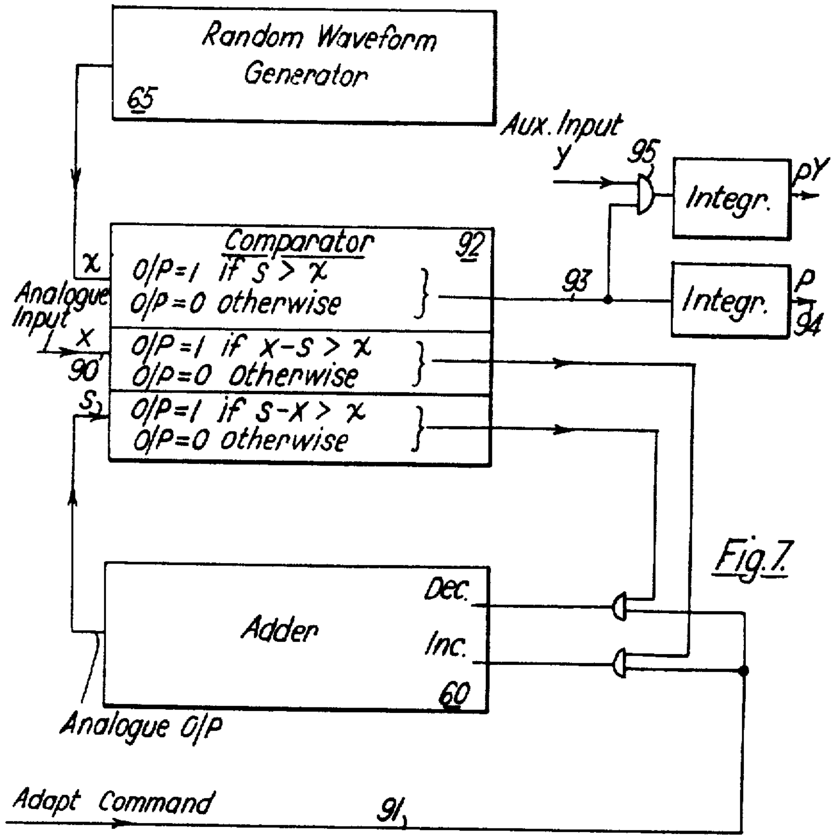

The foregoing and other features of the invention will be evident from the description of forms of adapture storage devices embodying the invention in its various preferred forms. The description refers to the accompanying drawing, in which:

FIG. 1 is a block diagram of a first form of storage device,

FIG. 2 is part of a logic table showing successive conditions of the device shown in FIG. 1, FIG. 3 is a block diagram of a second preferred form of storage device, FIG. 4 is a circuit diagram of part of the device shown in FIG. 3, FIG. 5 is a block diagram of a third form of storage device, FIG. 6 is a circuit diagram of the device shown in FIG. 5, and FIG. 7 is a logic diagram illustrating the general principle of devices of the kind shown in FIGS. 5 and 6.

The arrangement shown in FIG. 1 of the drawings is essentially a five-element binary store. The storage elements being the five bistable elements $BS_1$ to $BS_5$. The bistable elements may be of any form, but may conveniently be pairs of transistors or equivalent elements, the state of the bistable element being represented by the conducting state of one or other of the two transistors. Each bistable element has two setting inputs, a signal applied at a given input setting the bistable element to the corresponding state; a connection between a common signal input line and both input connections of a bistable device is used conventionally to indicate that a signal upon this input line causes a reversal of the state existing in the bistable element.

The state of the storage device is controlled by increment or decrement pulses applied to it over input connections 10 and 11 respectively. The effect of these pulses upon the store is determined by the connection pattern set up by a series of AND gating devices 12 which forms a connection pattern associating the input lines with the input and output connections of the bistable elements. The connection patterns 13 and 14, associated with the increment and decrement input lines respectively are identical but are mirror images of each other, in the sense that where a connection from the increment connection pattern 13 is made to the "set 1" input of a bistable element, the corresponding connection of the decrement connection pattern 14 is made to the "set 0" connection of that element. This pattern of symmetry applies to all the connections, input and output, of the bistable elements.

If the successive bistable elements $BS_1$, $BS_2$, $BS_3$, $BS_4$, and $BS_5$ are associated in the usual way with the binary-weighted scale $2^4$, $2^3$, $2^2$, $2^1$, $2^0$, the various combinations of their states define a counting scale consisting of the integers between 0 and 31 inclusive. However, for the storage of probabilities or weighting factors it is more convenient to regard the counting scale as covering the range of values between 0 and 1, in 32 equal steps, and to equate this range of values with the range whose extreme values are represented by the two possible values (conventionally 0 and 1) of the input to the store.

If the stored level represents the weight attaching to a given parameter or set of parameters in predicting a given event, the store may be required to respond to a further successful coincidence of the parameter or parameters with the given event by increasing the stored weighting value by a predetermined factor. Similarly in other applications the probability of a given element in a quasi-random binary sequence being, say "1," can be estimated by deriving a weighting value from the preceding elements in the sequence, decreasing the weighting value by a constant factor for each "1" in the sequence and decreasing the complement of the weighting value by the same factor for each "C."

The operation of the storage device may best be understood by considering the block diagram shown in FIG. 1 in association with the table given in FIG. 2. Assuming the storage device to be in its maximum count state, that is to say with all the bistable elements in the "1" state, the first input pulse on decrement line 11 is passed by gate A2 only to effect the reversal of the state of the second bistable element $BS_2$. The bistable elements include delay devices so that the "1" output from $BS_2$ following this switching operation cannot coincide with the initial decrement pulse to produce cumulative switching effects in other stages of the store. The next successive decrement pulse to arrive is passed by gates $A_1$ and $A_2$ to set the first bistable $BS_1$ to "0" and to reverse again the state of the second bistable $BS_2$. Subsequent decrement pulses result in the switching operation shown in the table in FIG. 2. It will be seen that as the result of the selective gating of the decrement pulses by the decrement connection pattern 14, each successive decrement pulse reduces the magnitude of the stored quantity represented by the state of the bistables by a factor of approximately 0.7 of its previous value. The rule for the operation of the store in response to decrement pulses can be expressed as follows:

Let the $n$th digit be the largest which is a "1";
Change the $n$th digit to "0" if $(n-1)$th digit is "0";
Finally reverse the state of the $(n-1)$th digit.

Pulses on the increment line 10 act on the store in a precisely analogous manner, but since the connections of the increment pattern 13 are made to the complementary connections of the bistable elements, as compared to those of the decrement pattern 14, the effect of a pulse on the increment line 10 will be to decrease, by successive factors of approximately 0.7, the complement of the stored quantity represented by the state of the bistables. Thus the essential symmetry of the bistable elements and their associated patterns of connections is employed to facilitate the carrying out of increment and decrement processes which have a similar symmetry. The rule for the operation of the store in response to increment pulses is the same as that given above for decrement pulses provided that "0" in the decrement rule is changed to "1" and vice versa.

The elements shown in the logic diagram forming FIG. 1 are bistable devices and gating devices which are realisable in electric circuit form as (for example) transistor pairs and diode gates. These circuits are in every-day use, and the provision of detailed circuit arrangements is therefore unnecessary to render the operation of this form of the invention clear to a man familiar with the field of logic circuits. The scope of the invention is of course not limited to electric circuit devices and the arrangement shown in FIG. 1 can equally well be realised by alternative forms of logic apparatus such as pneumatic or fluid-flow logic systems.

FIG. 3 of the drawings shows an alternative form of storage device in which the value of the incremental or decremental factor is continuously variable, in contrast with the arrangement shown in FIG. 1 where only certain fixed values are practicable. In the arrangement of FIG. 3 the storage device proper consists of a reversible adder 30 counting in any convenient scale and formed by a series of bistable storage elements associated with each other in conventional fashion by gating devices. Pulses applied to the adder input line 31 cause the adder to step up or down in its stored count according to a presence of a command signal on incremental or decremental control lines 32 and 33 respectively. Each input pulse on added input line 31 causes a unit change in the count stored in the adder.

The count stored in the adder or, if appropriate, its complement is converted (by conventional means indicated symbolically at 34) to an output quantity. This output quantity is applied to a decrementing circuit 35. Assuming the output quantity to be a voltage, it is applied across a potentiometer 36 at the slider 37 of which will appear a voltage which is a known fraction of that across the potentiometer as a whole. A capacitor 38 connected to the potentiometer slider forms a temporary storage element and is prevented from discharging through the potentiometer by a rectifier 39.

The operation of the circuit can be understood by considering its response to a decrement command signal presented on the decrement input line 40. The decrement command pulse sets the bistable element 41 to deliver an output on decrement control line 33, causing the adder 30 to deliver an output quantity representing the actual value of its stored count. (A command signal on increment command line 42, by setting the bistable element 41 to give a signal on increment control line 32, causes the adder 30 to deliver an output representing the complement of its stored count.)

The output of the adder is applied to the decrementing circuit 35 where the potentiometer 36 causes the capacitor 38 to charge to a voltage representing the desired new value of the store output. This new value 43 is applied together with the instantaneous value 44 to a comparator unit 45 which delivers an inequality signal over line 46 so long as the two quantities applied to it are unequal. The inequality output signal is used to control by means of a multiple AND gate 47 pulses derived from a continuous pulse generator 48 and applied to the input 31 of adder 30. The count stored in the adder is thereby stepped down until the instantaneous value of the output becomes equal to the desired value temporarily stored in capacitor 38. When this occurs the inequality signal on the comparator output line 46 disappears and gate 47 closes to prevent further stepping of the adder.

The stepping of the adder in response to pulses from the pulse generator 48 is also controlled by signals from the decrement and increment command lines 40 and 42, applied through OR gate 49; further AND gates 50 prevent meaningless operation of the adder by inhibiting, for example, any response to a decrement command pulse when the adder is in its zero count state.

It will be seen that the factor by which the store count varies in response to a decrement command signal depends solely on the setting of potentiometer 36, and is therefore continuously variable.

Operation of the circuit in response to an increment command signal is identical with that for decrement signals, excepting that the operations are performed on the complement of the count stored in the adder.

FIG. 4 of the drawings shows in more detail the circuit arrangements of parts of the system shown in FIG. 3.

FIG. 4 shows that the analogue equivalent of either the level stored in adder 30, or its complement, is obtained by one of two resistive weighting networks **51*a* and 51*b* associated with the respective stages of the adder bistables, so that the voltages appearing on the output lines 52*a* and 52*b* are measures of the stored level or its complement. One of these two quantities is selected for passing on to the decrement circuit 35 by means of a diode-transistor bridge gating circuit 53, which is controlled by signals applied to the base terminals of the transistors forming part of the bridge from the increment and decrement setting output 32 and 33 respectively of the bistable 41. The circuit is arranged so that a significant signal on either of the lines 32 or 33 blocks the associated transistor of the gating circuit 53, and thus removes the short-circuit on the appropriate store output line 52*a* or 52*b*. The store output signal (assumed to be a negative voltage) on this line is therefore passed on to the decrementing circuit 35 and the comparator 45**.

The operation of the decrementing circuit 35 has already been explained. The only point that needs further elaboration is that while the time constant of the circuit formed by the storage capacitor 38 and the base input impedance of the first transistor of the comparator circuit 45 is chosen so that the charge on the capacitor 38 does not vary significantly during the time taken to step the adder 30 to a new value, it is nevertheless short enough to allow the charge on capacitor 38 to leak away to a negligible quantity before the arrival of the next increment or decrement command signal.

FIG. 5 of the drawings shows a block diagram of another form of storage device that has particular advantages when the increment or decrement factor represented by an increment or decrement command signal is near unity. In these conditions the store is in effect required to respond to a series of positive or negative steps of small magnitude; for many purposes the accuracy of resolution of the stored value need not necessarily be high, but nevertheless the device must take account of the relatively small input steps. The effect of this can be best understood from a numerical example. If the resolution required in the main store is 3 percent, and if the increment at each step of integration can be as small as 0.1 percent of the maximum value of the main store, only five binary storage elements would be required in the main store but at least five additional elements would be required as an auxiliary store for dealing with the smallest increments and decrements.

The arrangement shown in FIG. 5 overcomes this difficulty by allowing the count stored in a reversible adder 60 to be altered in steps of relatively coarse resolution, in response to increment or decrement command signals arriving on inputs 61 and 62 respectively, each individual increment or decrement represented by a command signal being smaller than the scale units of the adder 60, by means of a probabilistic control circuit which allows the passage of a command signal to produce a unit step change in adder 60 with a probability that is a function of the count stored in the adder. To effect this, the adder output signal 63 is compared in a comparator device 64 with a signal from a random voltage generator 65, the output of this generator being chosen so that it covers the same dynamic range as the adder output with a distribution that depends on the increment law that the storage device is to follow. In a typical case the random generator output voltage is approximated by the sampling of the output voltage of an asynchronous linear sawtooth generator. The linearly distributed output voltage of the sawtooth generator has an amplitude equal to the dynamic range of the adder output and has a repetition frequency that is asynchronous with and, say, 30 times higher than the highest possible sampling frequency.

The output of this generator is sampled by sampling circuit 66 at the instant of arrival of each command signal and the instantaneous level of the waveform as determined by the sampler is fed into comparator 64. The comparator gives an output on one output line 67 if the sampled value of the random waveform is greater than the value of the adder output, and an output on a second line 68 if the sampled value is less than the adder output.

The increment or decrement command signal is also employed to set a bistable element 69 whose output sets the adder 60 to respond in the correct sense for increment or decrement signals. The actual stepping pulse for the adder applied at the stepping input 70 is obtained from the original increment or decrement command signal which after a short delay in unit 71 to permit the carrying out of the comparison process is applied to a pair of control gates 72. These gates are three input AND gates whose other two inputs are obtained from the increment or decrement setting lines 73, energized by bistable 69, and one of the two outputs 67 and 68 of the comparator 64. The arrangement is such that the adder 60 is stepped by one unit in the positive or negative sense only when all three inputs of one of the two gates 72 are energized. It will be seen that if, for example, an increment command signal is received on line 61, setting the bistable 69 to its "set increment" state, a pulse will only be passed to the input 70 of the adder if a pulse exists on comparator output line 67, indicating that the instantaneous sample value of the output of random generator 65 is greater than the current value of the adder output. If, as assumed, the output of the generator 65 has a linear distribution over the same dynamic range as the adder output, the probability of a signal appearing on output line 67 of the comparator is proportional to the difference between the maximum adder output and the current adder output.

Waveforms involving non-linear distributions of the random generator output voltage can be adapted in order to provide other functions of the input quantity as represented by the state of the store. A logarithmic distribution is of use in certain probability estimations, such as, for example, Bayesian predictors.

FIG. 6 shows a circuit diagram of a version of the arrangement of FIG. 5, based on diode-transistor logic circuits, those parts of the circuit that correspond to the blocks of FIG. 5 being identified. The operation of this circuit will be self-evident from the diagram. It will be noted that in this circuit the increment and decrement inputs 80 and 81 determine the direction in which the adder 60 is required to step, but not the stopping action itself, which is initiated by an adapt command input applied at 82 to a pulse shaping circuit 83 the output of which controls the sampling gate 66. The discrete input signals to which the store responds are therefore represented by the coincidence of an adapt command with an increment or decrement input.

In an alternative arrangement based on the principles of FIGS. 5 and 6, the "analogue" random waveform generator 65 is replaced by a digital random signal generator comprising a chain of bistable devices so interconnected that their output, considered as a binary quantity, cycles in a pseudo-random manner in response to a stepping input from a clock pulse source. The comparison process then involves comparing the slate of each bistable of the random generator with that of a corresponding bistable of the main store.

Finally, the general principles applicable to the class of devices to which FIGS. 5 and 6 refer are illustrated diagrammatically by FIG. 7. Since this diagram represents the general case the store input 90 is shown as an analogue quantity (i.e., having a continuous range of values) sampled at instants determined by the adapt command input 91. The comparator 92 in which the signals from the random waveform generator 65 and the adder 60 are compared then has the analogue input 90 as an additional input signal: the comparator delivers increment or decrement instinctions to the adder 60 according to the rules shown in the figure.

The adder 60 must not be allowed to "overcount" if correct operation of the store is to be obtained. That is to say the adder must not respond to an increment command when in its maximum count state by starting a new cycle from its minimum count state, and conversely for decrement signals. If the adder 60 is itself so arranged that "overcounting" in either sense is impossible then the relations between the ranges of values represented by the input signal, the adder analogue output and the random generator output are unrestricted, although upon these relations will of course depend the significance to be attached to the final store output. If the circuit of adder 60 is such that "overcounting" can occur, then external checks (equivalent to the gates 50 shown in the arrangement of FIG. 3) are necessary.

FIG. 7 also shows a method of utilising the store output, in which the comparator 92 continuously compares the value of the stored count in adder 60 with the output of the random generator 65, giving a signal on output 93 when the stored count is the greater. These signals can be integrated to give a direct indication of stored probability at 94 or can be used to trigger a gate 95 to pass pulses from an auxiliary input Y, the rate at which pulses are passed by the gate forming the store read-out.

It is to be understood that the foregoing description of specific examples of this invention is made by way of example only and is not to be considered as a limitation on its scope.

What we claim is:

1. Adaptive information storage apparatus responsive to discrete input signals comprising a plurality of multistable elements defining by the various combinations of their possible states a scale of storage levels wherein the multistable elements are associated to form a reversible adder and interconnecting means interconnecting the input signals with the multistable elements, the counting scale formed by the various successive combinations of the states of the elements defining the said scale of storage levels so that the input signals change the states of the multistable elements in such a way that the magnitude of the change in the stored level has a value determined directly or statistically by the values of two or more parameters including at least the value of the input signal and the level stored in the device immediately prior to receiving the input signal, wherein the scale of storage levels and the possible values of the input signals define ranges of values that have at least part of each range in common, and wherein any change in the stored level made by the device in response to an individual input signal is made in the direction that results in the lower value of the difference between the values of the input signal and of the new stored level, wherein positive or negative increment signals derived from the input signals are caused to effect the said changes in storage level, and wherein the apparatus is arranged so that the magnitude of the stored level, or of its complement, is caused by a negative or positive increment signal, respectively, to adopt a new value that is or approximates to a predetermined fraction of its previous value.

2. A device according to claim 1, including means for presenting as an adder output either the count stored in the adder or its complement in the adding counting scale and means for devising and storing a predetermined fraction of the adder output while causing the adder to step in a negative or positive sense in response to a negative or positive increment signal until equality obtains between the actual value of the adder output and the stored value.

3. A device according to claim 2, in which the adder output is presented as the magnitude of an output voltage and the said predetermined fraction of the adder output is obtained by a potentiometer circuit.

4. A device according to claim 3, wherein the said predetermined fraction of the adder output is stored as the charge in a capacitor.

5. Adaptive information storage apparatus responsive to discrete input signals comprising a plurality of multistable elements defining by the various combinations of their possible states a scale of storage levels, and interconnecting means interconnecting the input signals with the multistable elements so that the input signals change the states of the multistable elements in such a way that the magnitude of the change in the stored level has a value determined directly or statistically by the values of two or more parameters including at least the value of the input signal and the level stored in the device immediately prior to receiving the input signal, wherein the scale of storage levels and the possible values of the input signals define ranges of values that have at least part of each range in common, and wherein any change in the stored level made by the device in response to an individual input signal is made in the direction that results in the lower value of the difference between the values of the input signal and of the new stored level, wherein positive or negative increment signals derived from the input signals are caused to effect the said changes in storage level, and wherein the storage apparatus includes means for generating a randomly-varying signal including a source of a periodically varying analog signal which is sampled at instants determined by the increment signals, the sampling rate and the periodicity of the analogue signal being asynchronous so that the sampled analogue signal has a pseudo-random character and having a range of possible values, and a comparator for determining whether at any instant the value represented by the stored level or the value of the randomly-varying signal is the larger, the output of the comparator being applied to control the response to increment signals of a reversible adder formed by the multistable elements of the storage device, the said adder counting over a scale formed by the various successive combinations of the states of the multistable elements and defining the said scale of storage levels, the arrangement being such that a positive increment signal results in a unit increase of the count stored in the adder, corresponding to a unit increase in the stored level, if and only if the instantaneous value of the randomly-varying signal is greater than the value represented by the stored level, and conversely for negative increment signals, and such that over-counting by the adder beyond its maximum and minimum count conditions is prevented.

6. A device according to claim 5, wherein the value of the stored level is represented by the magnitude of a store output quantity, the comparator being arranged to determine whether the said output quantity or the sampled analogue signal is the larger.

7. A device according to claim 5, wherein the means for generating a randomly-varying signal includes a plurality of further multistable elements which define by the various combinations of their possible states the said range of possible values, and which are so associated that a succession of stepping signals presented thereto causes the value represented by the states of the further multistable devices to vary in a pseudo-random manner.

8. A device according to claim 7, wherein the two sets of multistable elements have the same number of possible states, the comparator being arranged to compare the state of each of the said further multistable elements with a corresponding element of the adder.

References Cited

UNITED STATES PATENTS

| | | | |
|---|---|---|---|
| 3,278,900 | 10/1966 | Wood | 340—146.3 |
| 3,317,901 | 5/1967 | Clapper | 340—172.5 |
| 3,333,249 | 7/1967 | Clapper | 340—172.5 |

PAUL J, HENON, *Primary Examiner.*

R. B. ZACHE, *Assistant Examiner.*